United States Patent [19]

Auge et al.

[11] 4,344,827
[45] Aug. 17, 1982

[54] PROCESS FOR WORKING UP NITRIC ACID

[75] Inventors: Wolfgang Auge, Cologne; Bernd Thelen, Leverkusen, both of Fed. Rep. of Germany; Karl-Werner Thiem, Charleston, S.C.; Rütger Neeff, Leverkusen, Fed. Rep. of Germany

[73] Assignee: Bayer Aktiengesellschaft, Leverkusen, Fed. Rep. of Germany

[21] Appl. No.: 164,445

[22] Filed: Jun. 30, 1980

Related U.S. Application Data

[63] Continuation of Ser. No. 50,906, Jun. 21, 1979, abandoned, which is a continuation-in-part of Ser. No. 820,529, Jul. 29, 1977, abandoned.

[30] Foreign Application Priority Data

Aug. 21, 1976 [DE] Fed. Rep. of Germany ....... 2637734

[51] Int. Cl.$^3$ .......................... B01D 1/00; B01D 3/14
[52] U.S. Cl. ............................. 203/13; 159/DIG. 19; 203/73; 203/91

[58] Field of Search ....................... 203/13, 71, 73, 74, 203/77, 80, 91; 423/391, 390 P; 159/47 R, DIG. 19; 560/12, 20, 21; 564/84; 260/369, 352, 357, 360, 362, 371, 376, 384, 396 R, 688

[56] References Cited

U.S. PATENT DOCUMENTS 3,479,254 11/1969 Miserlis ................................. 203/13
3,928,395 12/1975 Seha et al. ............................ 560/12

Primary Examiner—Frank Sever
Attorney, Agent, or Firm—Sprung, Horn, Kramer & Woods

[57] ABSTRACT

Process for working up aqueous nitric acid which is of a concentration above the azeotropic concentration and contains organic compounds in solution for suspension wherein said nitric acid of a concentration about the azeotropic concentration is distilled off in one or more rectification steps until the azeotropic nitric acid is obtained. In the process, certain specified ratios of nitric acid and water to organic constituents must be maintained.

10 Claims, No Drawings

PROCESS FOR WORKING UP NITRIC ACID

This is a continuation of application Ser. No. 50,906, filed June 21, 1979 now abandonded which in turn is a continuation-in-part of Ser. No. 820,529, filed July 29, 1977, now abandoned.

The present invention relates to a process for working up nitric acid which has a concentration above the azeotropic concentration and has been used for the nitration of aromatic compounds and is obtained when the aromatic nitro compounds are partly separated off.

It is known that dilute nitric acid which still contains organic compounds in solution or suspension is obtained from the nitration of aromatic compounds with nitric acid of a concentrator $\geq 70\%$ by weight and from the subsequent working up of the reaction mixture.

To carry out such nitration processes economically it is advantageous to work up the nitric acid which is obtained as dilute acid contaminated with organic compounds by distillation in such a way that azeotropic nitric acid and concentrated nitric acid are obtained by means of a rectification, it being possible for the concentrated nitric acid to be re-employed in the nitration process.

There is prejudice against working up nitric acid which is of a concentration above the azeotropic concentration and is also contaminated by aromatic compounds, especially nitroaromatic compounds, by distillation since it has been disclosed that a mixture of nitrobenzene, nitric acid and water exploded in a plant for the nitration of benzene with 65 to 75% strength by weight nitric acid (see Chem. Eng., May 9, 1966, page 163, and Chem. Eng. News, Nov. 28, 1960, page 47).

A process for working up aqueous nitric acid which is of a concentration above the azeotropic concentration and contains organic compounds in solution or suspension has now been found, which is characterised in that nitric acid of a concentration above the azeotropic concentration is distilled off in one (or more) rectification step (or steps) until an azeotropic nitric acid is obtained, it being necessary, during the rectification with acid concentrations of 80, 75, 70 and 68% by weight, to avoid weight ratios of nitric acid and water to organic constituents which are less than 13, 8, 5 and 4 respectiely, by (a) feeding the nitric acid containing organic compounds into the rectification section of a rectification column and taking off nitric acid which has a concentration above the azeotropic concentration at the top of the column, (b) if necessary further working up the sump product in one (or more) further rectification step (or steps) by distilling off nitric acid which has a concentration above the azeotropic concentration and, after the azeotrope point for nitric acid has been reached in step (a) or (b), completely evaporating this acid in a separate apparatus.

The process according to the invention is used for working up any nitric acid which has a concentration above the azeotropic concentration and contains organic compounds in solution or suspension.

In general and as used herein, azeotropic acid or azeotropic nitric acid is understood as a nitric acid azeotrope with water with a concentration of 67.5% by weight nitric acid (compare Coll. Czech. Chem. Commun 25, 579–582 (1960). This concentration holds for 760 mm Hg. However, it can vary between 65 and 68% by weight, depending on the pressure conditions. The process can preferably be used for working up 70 to 90% strength by weight nitric acid. The process according to the invention is particularly suitable for working up nitric acid which has a concentration of 70 to 80% by weight.

Working up of the nitric acid is not impaired, or is impaired to only a minor extent, by the amount of organic constituents dissolved or suspended in the nitric acid. Working up of the nitric acid is particularly successful when not more than about 10% by weight of organic constituents are dissolved or suspended in the acid.

The organic compounds dissolved or suspended in the nitric acid comprise, in particular, the aromatic compound which has been employed for the nitration but has not been converted and nitration products of this aromatic compound.

With the process according to the invention, the amounts of nitric acid employed are such that, for a specific concentration of nitric acid, the weight ratios of nitric acid and water to organic constituents do not fall below values which are as specific as possible.

The weight ratio is defined as follows: the weight of the nitric acid present, calculated as 100% strength by weight nitric acid, is added to the weight of the water present, which has been introduced with the nitric acid, and this sum is divided by the total weight of the organic constituents present.

The value below which the weight ratio must not fall during working up is 13 when 80% strength by weight nitric acid is present and 4 when 68% strength by weight nitric acid is present. As a first approximation, it can be assumed that, between these two acid concentrations, a linear dependence exists between the value below which the weight ratio must not fall and the particular acid concentration. On more precise examination, this dependence is not strictly linear but is somewhat more strongly pronounced at higher acid concentrations than at lower acid concentrations.

Preferably, however, the process is not carried out using the abovementioned weight ratios for the nitric acid mixture to be worked up but using somewhat higher weight ratios.

For example, when 80% strength by weight nitric acid is present, the weight ratio can be at least 15 and when 68% strength by weight nitric acid is present it can be at least 4.5. For nitric acid concentrations between these two values, the weight ratio can have corresponding intermediate values.

Working up of the nitric acid by the process according to the invention can be carried out in vacuo, but also under normal pressure. The pressure can range from about 50 to about 760 mm Hg. Preferably, working up is carried out under normal pressure. The temperatures depend on the particular acid concentration present and on the pressure. In general, they are in the range from 40° C. to 125° C.

Working up, according to the invention, of the nitric acid mixture can be carried out in one or more rectification columns. Rectification columns of any desired design can be used for this purpose, for example plate columns, packed columns or falling film columns. In particular, rectification columns of the type customarily used for obtaining highly concentrated nitric acid from nitric acid of a concentration above 66% by weight are suitable.

The rectification column is operated in such a way that the nitric acid taken off at the top is more highly concentrated than that in the mixture which is fed in. It is advantageous to take off, at the top of the first rectification column, nitric acid which has a concentration such that it can be re-used for the nitration of aromatic compounds. The nitric acid taken off at the top of the rectification column can still contain nitrogen oxides, such as $N_2O_5$, $N_2O_4$, $N_2O_3$ and/or NO. Advantageously 81 to 99.5% strength by weight nitric acid is taken off at the top of the first column and this can then be re-used direct for a nitration. However, if the rectification is carried out in such a way that an azeotropic nitric acid is produced in the sump of this column, the entire nitric acid can be distilled off in a further evaporation step without a column and, in this way, the organic products present in the nitric acid can be separated off. If a nitric acid which has a concentration above the azeotropic concentration is produced in the sump, azeotropic nitric acid must be obtained in the sump of the second column in the second rectification step so that drying of the organic product can be carried out in a further step. For this purpose, nitric acid concentrations which are in the range from 70 to 95% by weight can be produced at the top of the second column.

A particularly advantageous variant of the process according to the invention consists in taking off concentrated nitric acid, which can be re-employed in the nitration reaction, at the top of the first column and, in the downstream second and/or third distillation step, obtaining acids which are so pure that they can be re-used directly in this form.

The number of trays in the rectification column(s) to be used according to the invention depends on the acid concentration of the nitric acid mixture which is fed in and on the desired concentration of the nitric acid to be taken off at the top. In general, rectification columns which possess 3 to 20 theoretical plates are used. Preferably, rectification columns with 4 to 15 theoretical plates are used.

The point at which the nitric acid mixture is fed into the particular rectification column depends on the concentration of the nitric acid in the mixture and on the concentration profile in this rectification column.

The rectification column(s) is (are) designed and operated in such a way that the concentration of the nitric acid in the sump is less than that in the feed, but the minimum concentration of nitric acid in the sump does not fall below the azeotropic point.

An important aspect of the present invention is that, depending on the concentration of the nitric acid present in a particular case, the weight ratio of nitric acid and water to organic constituents does not fall below 4 (when azeotropic nitric acid is present) to 13 (when 80% strength by weight nitric acid is present) at any point in the rectification column(s) during working up by distillation.

No particular attention has to be paid to that section of the rectification column(s) in which concentration of the nitric acid takes place, that is to say the section between the feed point for the nitric acid mixture and the top of the rectification column(s). In this section of the apparatus, the weight ratios set up are necessarily higher than those in the nitric acid mixture which runs in. Below the feed point for the nitric acid mixture, and especially in the sump of the rectification columns(s), enrichment of the organic constituents usually takes place, nitric acid simultaneously being driven off. The weight ratio therefore falls here.

If the nitric acid in the nitric acid mixture to be worked up is relatively dilute, for example is a nitric acid in the concentration range of 70 to 80% by weight, and the weight ratio is relatively high, for example is a weight ratio of above 15 (for nitric acid concentrations in the range of 70–75% by weight) or of over 20 (for nitric acid concentrations in the range of 75–80% by weight, it is not generally necessary to take special measures to ensure that the values of the weight ratios in the lower region and in the sump of the rectification column(s) do not fall below those previously stated.

If, however, other mixtures are to be worked up, for example mixtures in which nitric acid is present in a concentration in the range of 70–75% by weight and the weight ratio is relatively low, for example is a weight ratio of less than 12, or mixtures in which concentrated nitric acid, for example 75–100% strength by weight nitric acid, is present and the weight ratio is below 15, it is generally necessary to take special measures so that the values for the weight ratios in the lower part or in the sump, especially of the first rectification column, do not fall below the weight ratios indicated above. In these cases, it is possible to avoid too great a fall in the weight ratio by adding water or nitric acid which has a concentration less than or equal to that in the nitric acid mixture to be purified at a point below the feed point for the nitric acid mixture to be purified. Care must be taken that the amount of water or nitric acid added is such that the weight ratios do not fall below those indicated above at any point in the rectification column(s). If nitric acid is added in a concentration above the azeotropic point, care must be taken that the sum of all the column feeds gives a mixture which has a nitric acid concentration above the azeotropic point. Water or nitric acid having a concentration which is equal to or less than that in the nitric acid mixture to be worked up can be added at any desired point below the feed point for the nitric acid mixture to be worked up, for example into the sump of the rectification column(s). If the addition is to be made into the rectifying section of the rectification column(s), it is advantageous to add nitric acid in a concentration which deviates at most by ±5% by weight from the concentration of the nitric acid which, without addition of nitric acid, is present at the feed point in the rectification column(s). In this way, the rectification in the column(s) is not disturbed to too great an extent. Irrespective of whether water or nitric acid is additionally fed in or not, the particular rectification column can be operated under normal pressure, reduced pressure or slightly elevated pressure. The process is generally carried out under pressures in the range from about 50 to about 760 mm Hg, but preferably under normal pressure.

The temperatures at which the rectification column(s) is(are) operated depend on the pressure in the rectification column(s), on the concentration of the nitric acid in the mixture and on the concentration of the nitric acid taken off at the top of the rectification column(s).

The reflux ratio R/T (ratio of the liquid reflux to the take-off of nitric acid of a concentration which is above the azeotropic concentration) of the rectification column can be varied within wide limits. For example, the reflux ratio can be in the range from 0 to 5. Reflux ratios of 0.1 to 1 are preferred. The concentration of the nitric acid which optionally refluxes can be higher than, or equal to, the acid concentration on the tray onto which the refluxed acid runs back.

When the process according to the invention is used for working up, by distillation, the nitric acid which is obtained from the preparation of nitroanthraquinones by nitration of anthraquinone with concentrated nitric acid and subsequent working up and which has a concentration of about 70 to about 80% by weight and contains anthraquinone and nitroanthraquinones, in the main 1- and 2-nitroanthraquinone, but also dinitroanthraquinone, in solution or in suspension, the procedure can be such that nitric acid of a concentration above the azeotropic concentration is distilled off in one (or more) rectification step (or steps) until, ultimately, an azeotropic nitric acid is obtained, it being necessary, during the rectification with acid concentrations of 80 and 68% by weight, to avoid weight ratios of nitric acid and water to organic constituents which are less than 13 and 4, by (a) feeding the nitric acid containing anthraquinone and nitroanthraquinones into the rectification section of a rectification column and taking off nitric acid which has a concentration above the azeotropic concentration at the top of the column, (b) if necessary working up the sump product in one (or more) further rectification step (or steps) by distilling off nitric acid which has a concentration above the azeotropic concentration and, after the azeotrope point for nitric acid has been reached in step (a) or (b), completely evaporating this acid in a separate apparatus.

The rectification can be carried out in vacuo or under normal pressure.

In an industrial embodiment, a mixture of nitric acid ($\leq 80\%$ by weight), anthraquinone and nitroanthraquinones is fed, in a weight ratio of $\geq 5$, into the upper half of a rectification column which contains a total of 6 to 14 theoretical plates. The rectification columns is usually operated under normal pressure (but it can also be operated under a vacuum). An 81 to 99% strength by weight nitric acid, which can be re-used for a nitration, is taken off at the top of the column.

The reflux ratio at the top of the column is about 0.1 to 4.

An approximately 70% strength by weight nitric acid is produced in the sump of the column; the weight ratio is $\geq 5$. The sump product is then fed into the upper half of a further rectification column which contains a total of 4 to 8 theoretical plates. This rectification column is usually operated under normal pressure. However, it can also operated under a vacuum. Nitric acid of a concentration which is above the azeotropic concentration is taken off at the top of the column in an amount such that an acid concentration of 67.5 to 68.0% by weight and a weight ratio of $<7$ are set up in the sump. The reflux ratio at the top of this column is then about 0.1 to 1.

In a further step (thin-film evaporator and the like), the anthraquinone/nitroanthraquinone mixture is completely freed from nitric acid.

The process according to the invention is especially suitable for working up nitric acid which has a concentration above the azeotropic concentration and has been used for the nitration of aromatic compounds and contains organic compounds in solution or suspension. The concentrated nitric acid which is recovered can be re-employed in the nitration process and the dilute acid can be re-employed at other points and this ensures that the nitration process is carried out in a particularly economical manner. In addition, the working up and re-use of the nitric acid obtained by the process according to the invention takes account of the present day high ecological demands. The fact that the process can be employed without hesitation from the safety point of view for working up nitric acid, which is contaminated with aromatic nitro compounds, by distillation may be mentioned as a further advantage of the process according to the invention.

The examples which follow are intended to illustrate the process according to the invention in more detail without, however, restricting it to these examples.

The composition of the anthraquinone/nitroanthraquinone mixtures mentioned in the examples can vary. In addition to anthraquinone and 1-nitro- and 2-nitro-anthraquinone, they also contain dinitroanthraquinones (1,5-, 1,6-, 1,7-, 1,8-, 2,6- and 2,7-dinitroanthraquinone).

EXAMPLE 1

98.7 kg/hour of a solution of nitric acid (75.6% by weight) and an anthraquinone/nitroanthraquinone mixture is fed, at a weight ratio of WR~30, onto the 7th tray of a 14-tray rectification column. At the top of the column, 18.9 kg of highly concentrated nitric acid (99% strength by weight) are obtained per hour, with a reflux ratio of R/T=4/1. The column operates under normal pressure; a temperature of 84° C. is obtained at the top. A mixture which consists of the anthraquinone/nitroanthraquinone mixture and a 70% strength by weight nitric acid is taken off from the sump of the column at a sump temperature of 122° C. The amount withdrawn per hour is 79.8 kg. The weight ratio is WR~24. This mixture passes onto the 6th tray of a second rectification column. The column has 8 trays and operates under normal pressure. At the top of this column, 60.5 kg/hour of nitric acid (70.6% strength by weight) are taken off, at a reflux ratio of R/T=0.2/1. The temperature at the top is 120° C. The anthraquinone/nitroanthraquinone mixture concentrates in the sump of the column to a weight ratio of WR=5 with an acid concentration of about 67.5% by weight. This sump product (19.3 kg/hour) is then separated, in a thin-film evaporator, into azeotropic nitric acid (16.1 kg/hour) and an anthraquinone/nitroanthraquinone mixture (3.2 kg/hour).

EXAMPLE 2

55 kg/hour of a solution of a 74% strength by weight nitric acid and an anthraquinone/nitroanthraquinone mixture is fed, at a weight ratio of WR=10, to the 10th tray of a 14-tray rectification column. At the top of the column, 25 kg per hour of an 81.5% strength by weight nitric acid is distilled off at a reflux ratio R/T=1/1. The column operates under normal pressure. The boiling point at the top is 110° C. A mixture which consists of 67.5% strength by weight nitric acid and the anthraquinone/nitroanthraquinone mixture employed is taken off at the sump of the column at a sump temperature of 123° C. The weight ratio is WR=5 and the amount withdrawn is 30 kg/hour. This sump product can subsequently be separated, in a thin-film evaporator, into azeotropic nitric acid (25 kg/hour) and an anthraquinone/nitroanthraquinone mixture (5 kg/hour).

EXAMPLE 3

90 kg/hour of a solution of an 80% strength by weight nitric acid and an anthraquinone/nitroanthraquinone mixture is fed, at a weight ratio of WR=14, to the 9th tray of a 10-tray rectification column. At the top of the column, 60 kg/hour of an 85% strength by weight nitric acid are distilled off at a reflux ratio R/T=0.15/1. The column is operated under normal pressure. The boiling point at the top is 106° C. 6 kg/hour of an azeotropic nitric acid (67.5% by weight) are fed into the sump of the column so that the sump product (about 36 kg/hour) can be taken off at a weight ratio WR=5. The acid which runs off has a nitric acid content of 67.5% by weight. This sump product is then separated, in a thin-film evaporator, into azeotropic nitric acid (30 kg/hour) and an anthraquinone/nitroanthraquinone mixture (6 kg/hour).

What is claimed is:

1. Process for working up aqueous nitric acid which has a concentration of about 70 to about 80% by weight and contains anthraquinone and nitroanthraquinones in solution or suspension, said process comprising (1) feeding the nitric acid containing anthraquinone and nitroanthraquinones into the rectification section of a rectification column, (2) taking off nitric acid which has a concentration above the azeotropic concentration at the top of the column until, in the liquid phase, the azeotrope point for nitric acid has been reached and then (3) completely evaporating this acid in a separate apparatus to obtain the azeotropic nitric acid with the proviso that in step (2) the weight ratio, adjusted to provide a non-explosive mixture of nitric acid plus water to organic compounds is at least 13, 8, 5 and 4 when the nitric acid concentration in the liquid phase is 80, 75 and 70 and 68 by weight, respectively.

2. A process of claim 2 wherein, after taking off nitric acid which has a concentration above the azeotropic concentation at the top of the column, subjecting the sump product to one or more rectification steps by distilling off nitric acid which has a concentration above the azeotropic concentration and, after the azeotropic point for nitric acid has been reached, completely evaporating this acid in a separate apparatus to obtain the azeotropic nitric acid.

3. Process according to claim 2, characterized in that water or nitric acid of a concentration below or equal to that in the nitric acid mixture to be purified is added to one or more rectification columns below the feed point for the nitric acid mixture to be purified.

4. Process according to claim 3, characterized in that water or nitric acid having a concentration which is equal to or less than that in the nitric acid mixture to be worked up is added to the sump of one or more rectification columns.

5. Process according to claim 3, characterized in that nitric acid of a concentration which varies by at most ±5% by weight from the concentration of the nitric acid which is present at the feed point of said rectification columns without addition of nitric acid is added to the rectification section of the said rectification columns below the feed point for the nitration mixture.

6. Process according to claim 2, characterized in that said one or more rectification columns employed, each contain 3 to 20 theoretical plates.

7. Process according to claim 2, characterized in that said one or more rectification columns is operated under a pressure in the range from about 50 to about 760 mm Hg.

8. Process according to claim 1, characterized in that said one or more rectification columns employed each contain 3 to 20 theoretical plates.

9. Process according to claim 1, characterized in that the rectification column (s) is (are) operated under a pressure in the range from about 50 to about 760 mm Hg.

10. Process for working up aqueous nitric acid which is of a concentration above the azeotropic concentration and contains organic nitro compounds in solution or suspension said process comprising (1) feeding the nitric acid containing said organic compounds into the rectification section of a rectification column, (2) taking off nitric acid which has a concentration above the azeotropic concentration at the top of the column until, in the liquid phase, the azeotropic point for nitric acid has been reached and then (3), completely evaporating this acid in an apparatus to obtain the azeotropic nitric acid with the proviso that in step (2) the weight ratio adjusted to provide a non-explosive mixture of nitric acid plus water to organic compounds is at least 13, 8, 5 and 4 where the nitric acid concentration in the liquid phase is 80, 75, 70 and 68% by weight respectively.

* * * * *

UNITED STATES PATENT AND TRADEMARK OFFICE
CERTIFICATE OF CORRECTION

PATENT NO. : 4,344,827
DATED : August 17, 1982
INVENTOR(S) : Wolfgang Auge, et al It is certified that error appears in the above—identified patent and that said Letters Patent is hereby corrected as shown below:

Abstract          Line 3, after "solution" delete "for" and insert --or--
Col. 1, line 16   Delete "concentrator" and insert --concentration--
Col. 4, line 6    After "weight" add -- ) --
Col. 5, line 32   Delete "columns" and insert --column--
Col. 7, line 30   Delete "claim 2" and insert -- claim 1--

Signed and Sealed this

Fourteenth Day of December 1982

[SEAL]

Attest:

GERALD J. MOSSINGHOFF

Attesting Officer    Commissioner of Patents and Trademarks